(12) United States Patent
Calderon et al.

(10) Patent No.: US 7,967,881 B2
(45) Date of Patent: Jun. 28, 2011

(54) METHOD AND APPARATUS FOR GASIFYING SOLID FUELS

(76) Inventors: Albert Calderon, Bowling Green, OH (US); Terry James Laubis, Bowling Green, OH (US); Richard Owen McCarthy, Bowling Green, OH (US)

( * ) Notice: Subject to any disclaimer, the term of this patent is extended or adjusted under 35 U.S.C. 154(b) by 1007 days.

(21) Appl. No.: 11/880,708

(22) Filed: Jul. 24, 2007

(65) Prior Publication Data
US 2009/0025292 A1 Jan. 29, 2009

(51) Int. Cl.
*C10B 1/00* (2006.01)
*C10J 3/00* (2006.01)
*C10J 3/46* (2006.01)

(52) U.S. Cl. .................. 48/197 FM; 48/197 R; 100/41; 100/179

(58) Field of Classification Search .................. 422/232, 422/233, 32; 208/244; 423/242.1–244.11, 423/260, 530–570, 585, 202; 414/173–177, 414/180–186; 100/214–294
See application file for complete search history.

(56) References Cited

U.S. PATENT DOCUMENTS

| | | | | |
|---|---|---|---|---|
| 4,044,904 A * | 8/1977 | Trumbull et al. | ............ | 414/808 |
| 4,343,233 A * | 8/1982 | Burgin | ............ | 100/116 |
| 4,978,369 A * | 12/1990 | Pontow et al. | ............ | 48/197 R |
| 5,466,108 A * | 11/1995 | Piroska | ............ | 414/218 |
| 2005/0081766 A1* | 4/2005 | McIntosh | ............ | 110/286 |
| 2007/0199801 A1* | 8/2007 | Chataing et al. | ............ | 198/662 |
| 2009/0022570 A1* | 1/2009 | Craig et al. | ............ | 414/197 |

* cited by examiner

*Primary Examiner* — Alexa D Neckel
*Assistant Examiner* — Imran Akram

(57) ABSTRACT

A method and apparatus for gasifying a solid fuel within a pressurized gasifier without a lockhopper, a slurry or pulverization comprising the feeding of said fuel into a charging chamber having a first section equipped with a ram through which a mandrel is disposed, and a second section within which an impervious seal is formed from the solid fuel by the compressive forces generated by said ram and a third section into which the seal is advanced while said ram forms a successive seal in said second section. The seal from said third section is reduced in size and charged into the pressurized gasifier where it is gasified without loss of pressure. The gases produced are utilized to polygenerate products such as transport fuels and electric power, and a fertilizer from waste gas resulting from the combustion of one of the produced gases.

29 Claims, 10 Drawing Sheets

METHOD AND APPARATUS FOR GASIFYING SOLID FUELS

This invention relates to an improved method and apparatus for gasifying solid fuels such as coal, coke, lignite, peat, wood, biomass, shale, oil sands, etc., in a furnace, a vessel, a gasifier, or the like, hereinafter referred to as a "Gasifier," which operates at pressure.

BACKGROUND

The present invention described herein is a further development of Applicants' issued U.S. Pat. No. 6,911,058 B2, which discloses a method for producing clean energy from coal. This development resides in improving the referenced method as follows:

Eliminating lockhopper feed;
Enhancing the flow of the solid fuel to prevent bridging;
Eliminating the use of pulverized feed;
Providing Gasifier lining protection to extend refractory life;
Enabling the use of solid fuels that contain high moisture, such as sub-bituminous coal, without drying, while using the moisture advantageously to produce water gas;
Providing low input of oxygen;
Improving oxygen injection;
Providing a pressure seal made from the solid fuel feed with features for the automatic maintenance of operating process pressure within the Gasifier;
Providing the capability to capture greenhouse gases such as a flue gas containing $N_2$ and $CO_2$; and
Processing the flue gas to make a useful by-product such as a fertilizer.

Objective

The overall objective of this invention is to provide a method and apparatus that consolidate the above-mentioned improvements, and other related improvements, into an approach which is more efficient, less costly and badly needed in the field of energy production from fossil fuels and especially from abundant coal that is prevalent in many parts of this planet. This overall objective will become more apparent to those skilled in the art to which this invention pertains from the description and appended claims. It is to be noted that the above-mentioned improvements are not only applicable to Applicants' referenced patent but also to gasification processes of others, such as the entrained bed, the fixed bed and the fluidized bed. With respect to the entrained bed the disadvantageous features are: coal pulverization, coal/water slurry, large water requirement, excess oxygen consumption, poor lining life and high capital cost. With respect to the fixed bed, the disadvantageous features are: generation of cancer-causing agents, inability to use caking coals, water contamination requiring extensive water treatment facilities, and high capital cost. With respect to the fluidized bed, the disadvantageous features are: coal pulverization, non-caking coals, and high capital cost. None of the gasification processes mentioned above, in exclusion of the Applicants', possesses hot gas cleanup above 600° C., nor the conversion of flue gas, a greenhouse gas consisting of $N_2+CO_2$, into a useful by-product.

Reference is now made to the accompanying drawings forming a part of this specification. It is to be noted that the embodiments shown herein are for the purpose of description and not limitation.

Before proceeding with the detailed description of the invention by making use of the drawings, it is to be noted that for the sake of clarity reference will be made with numerals and letters to identify the various components of the apparatus. The method will be described by way of example as it relates to the gasification of coal, with full cognizance that the method is capable of processing other solid fuels.

DETAILED DESCRIPTION OF THE DRAWINGS

Figure 1:
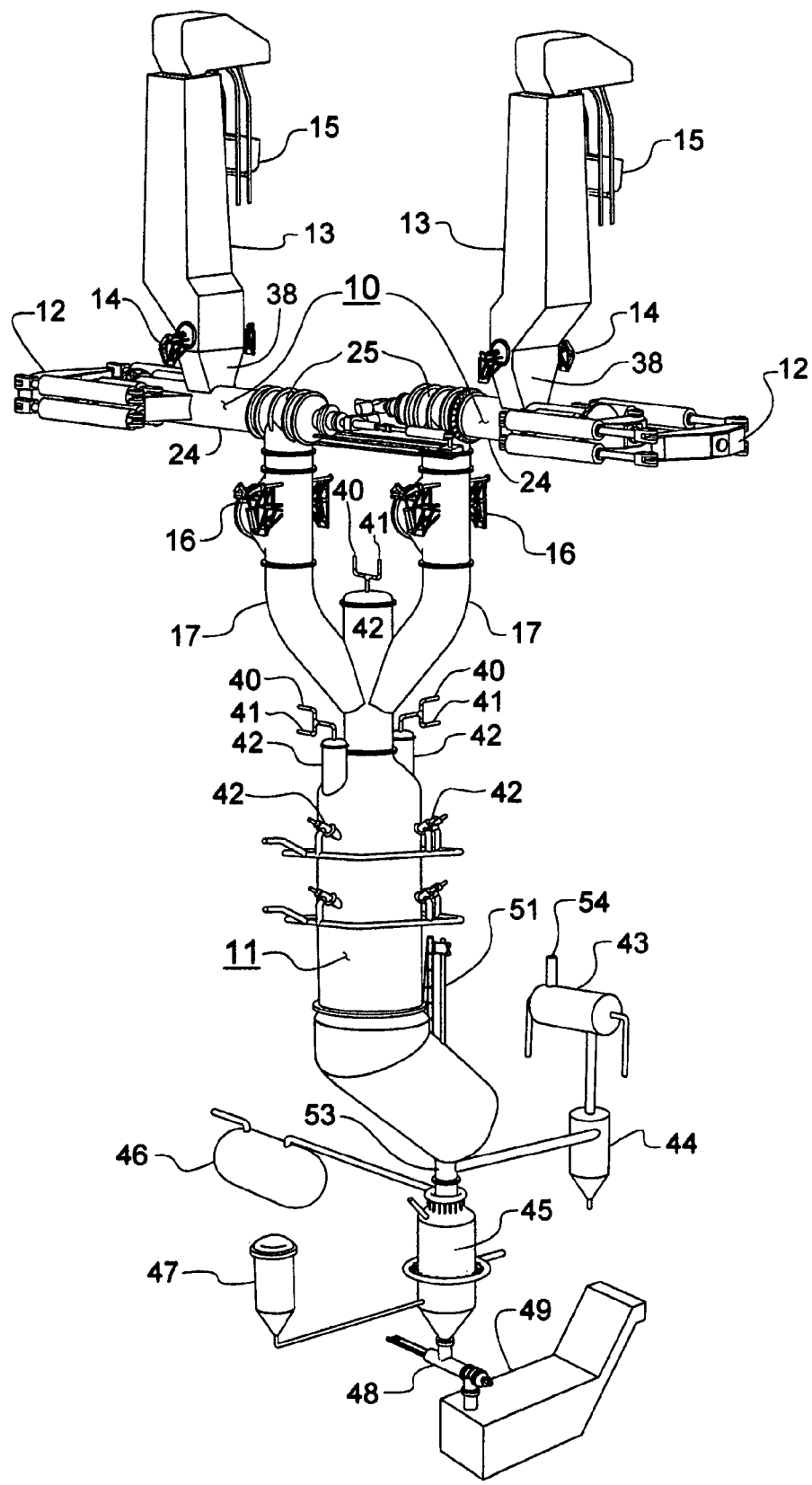
FIG. 1 represents the apparatus to practice the method; it illustrates that dual feeding units that may be provided for redundancy and for adequate charging capacity in oversized systems that require large inputs of feed.

Referring to FIG. 1, numeral 10 represents the force feeding mechanism, hereinafter called "Charger," disposed above a Gasifier denoted by numeral 11. In this FIG. 1, dual Chargers are illustrated to show the capability of furnishing modular mechanisms to accommodate the charging needs of large Gasifiers; such modularity also serves to provide redundant capabilities. Each Charger possesses actuating means denoted by numeral 12, and individual surge capacity bunkers marked by numeral 13. Towards the bottom of each bunker 13, a feeder denoted by numeral 14 is situated to control the flow of coal into a charging chamber marked by numeral 24. A coal-delivery means that services bunker 13 is marked by numeral 15. It is to be noted that bunkers 13 taper in such a way as to diverge downwardly to provide a larger dimension at the bottom than at the top of bunker 13 in order to prevent bridging of the coal as it flows down toward feeder 14. A valve denoted by numeral 16 is provided in down-corner pipe 17 that leads to Gasifier 11 from each Charger 10.

Gasifier 11 possesses a plurality of injection ports marked by numeral 42 for the introduction of a gas containing oxygen by means of injectors 40 and steam via pipe 41. At the bottom of Gasifier 11 a common port 53 is provided for the exit of gas and of slag or ash. Other components include a cyclone denoted by numeral 44 for particulate removal from the gas, a heat-recovery system marked by numeral 43 equipped with gas exit port 54, a lance marked by numeral 51 to maintain port 53 open, a quench system 45 for the solidification of slag with heat-recovery steam features 46, and a water supply tank 47 for the supply of quench water. Downstream of quench system 45, a sealing system denoted by numeral 48 is provided to transfer the quenched slag from pressurized Gasifier 11 without pressure loss. A holding tank marked by numeral 49 receives the quenched slag which is operative at atmospheric pressure.

Figure 2:
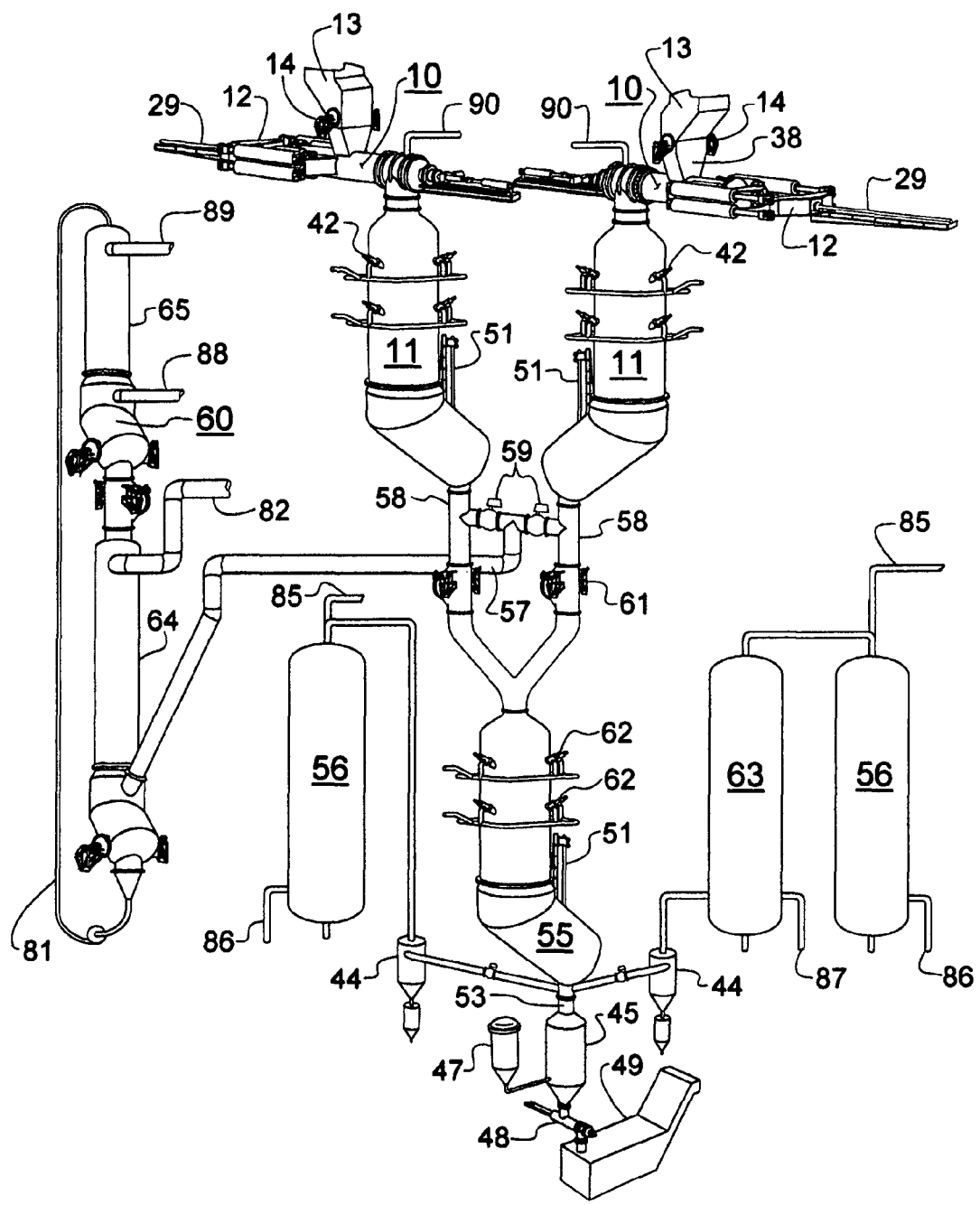
FIG. 2 is a variation of FIG. 1 wherein dual Gasifiers are provided for redundancy in such a way that both can be operated at lower capacity or a single one at nominal capacity, with the char that is produced not being fully consumed in the Gasifiers but transferred to a third Reactor for processing to produce a valuable by-product.

Referring to FIG. 2, which illustrates a configuration of a pair of primary Gasifiers 11, the same as Gasifier 11 shown in FIG. 1, with a downstream secondary reactor denoted by numeral 55 whose purpose is to react flue gas with hot char which is fed from primary Gasifiers 11 via downcomers 58. Secondary reactor 55, hereinafter referred to as a "cyanogen unit," is equipped with injectors 62 to introduce flue gas made up of $N_2+CO_2$, a greenhouse gas which is suspected of contributing to global warming.

The lower part of cyanogen Unit 55, is equipped with the same apparatus as that described in FIG. 1 for handling gas and slag via common port 53. Cyanogen unit 55 is followed by a by-product reaction column denoted by numeral 56 with a separator 63 being interposed between cyanogen unit 55 and column 56. Beneath primary Gasifiers 11, two piping configurations denoted by numerals 57 and 58 are provided. Configuration 57 serves to exhaust gases generated in Gasifiers 11, and configuration 58 serves to direct hot char as downcomers from both Gasifiers 11. Configuration 57 is provided with directional valves 59 from either Gasifier 11 to direct raw syngas to a hot gas cleanup system which is operated above 600° C. denoted by numeral 60 which is composed of lower vessel 64 and upper vessel 65; a transport system, marked by numeral 81, is provided for transporting sulfidated sorbent from vessel 64 to vessel 65 to regenerate the sulfidated sorbent. In certain applications, separator 63 may be obviated as shown on the left side of cyanogen unit 55.

Figure 2A:
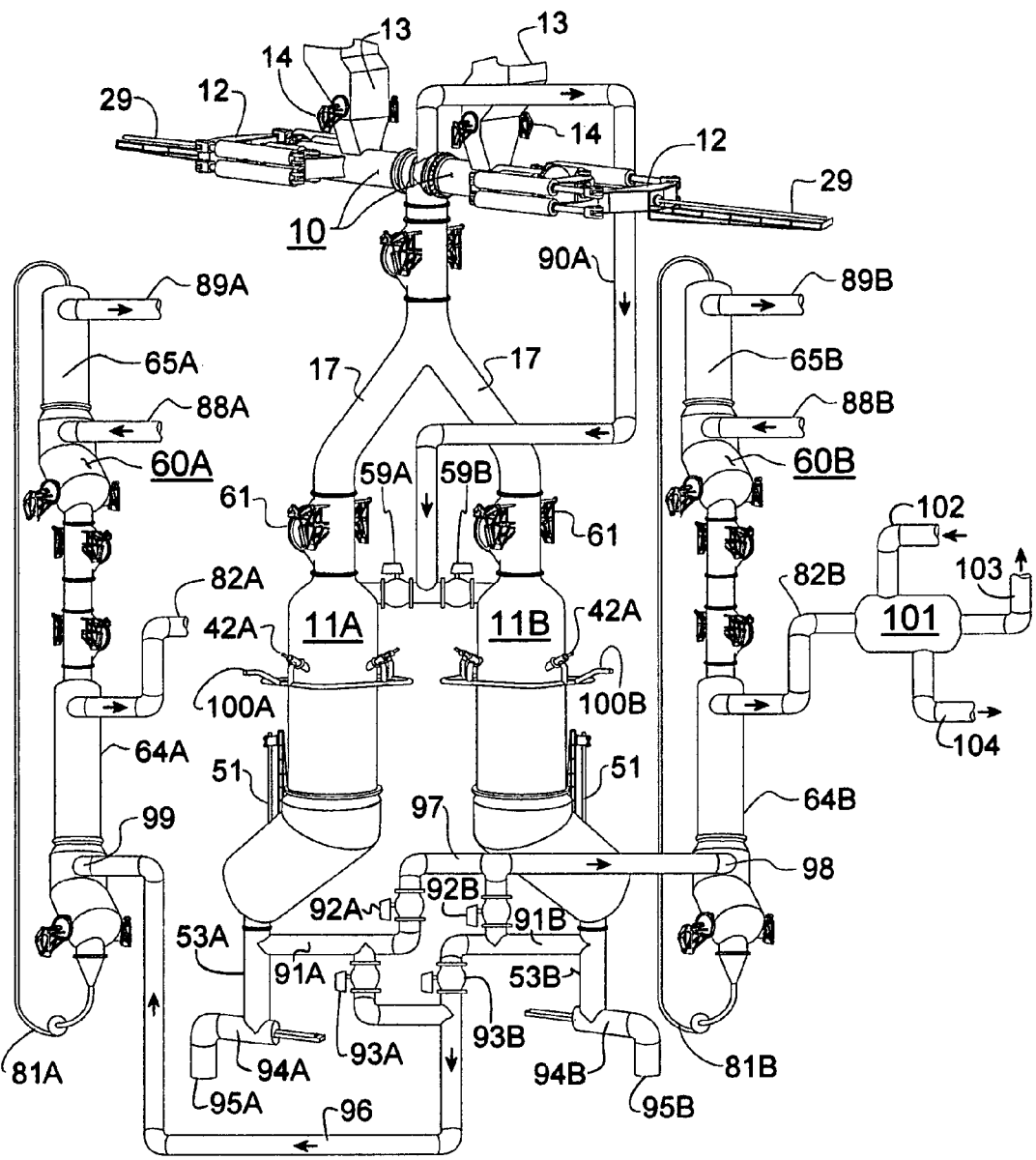
FIG. 2A is a variation of FIG. 2 wherein the dual Gasifiers that are provided are operated in an alternating configuration.
Figures 2B, 2C:
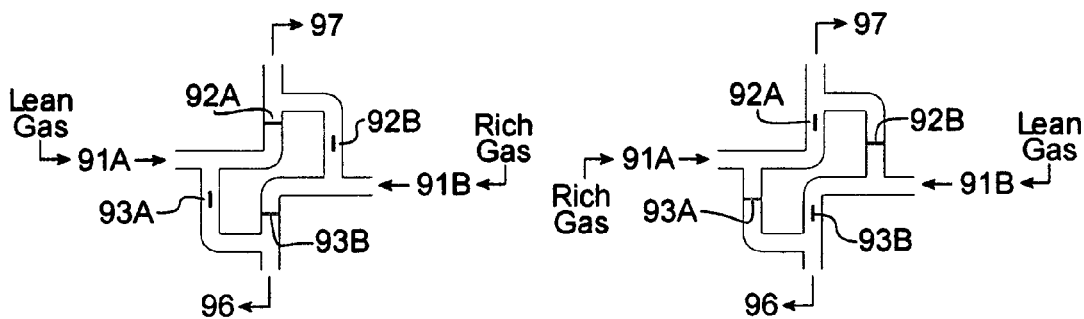
FIGS. 2B and 2C illustrate valves positions as they relate to the operation of the alternating configuration of FIG. 2A.

Referring to FIG. 2A which comprises a variation of FIG. 2 with respect to the operation of Gasifiers 11 wherein they are identified as Gasifiers 11A and 11B. This variation includes the following structural changes: (i) Providing two separate gas cleanup systems denoted by numerals 60A and 60B; (ii) the feed of char by means of Chargers 10 being bifurcated by means of downcomers 17 to enable the feed of the hot char into either Gasifier 11A or Gasifier 11B; (iii) the gas generated from pyrolysis of the coal and exhausted via pipes 90 in FIG. 2, are joined together to form a common duct denoted by numeral 90A in FIG. 2A; (iv) a pair of valves marked by numerals 59A and 59B situated at the top of Gasifiers 11A and 11B serving to direct the pyrolysis gas transported by duct 90A into either Gasifier 11A or Gasifier 11B; (v) another valve configuration disposed downstream of the exits located at the bottom ends of Gasifiers 11A and 11B consisting of two pairs of valves, one such pair being denoted by numerals 92A and 92B and the other pair being denoted by numerals 93A and 93B, with valves 92A and 92B being connected to gas cleanup 60B via duct 97 and valves 93A and 93B being connected to gas cleanup 60A via duct 96. The functions of the enumerated valves will be described in the Operation Section of this disclosure by referring to FIGS. 2A, 2B and 2C.

Figures 3, 3A:
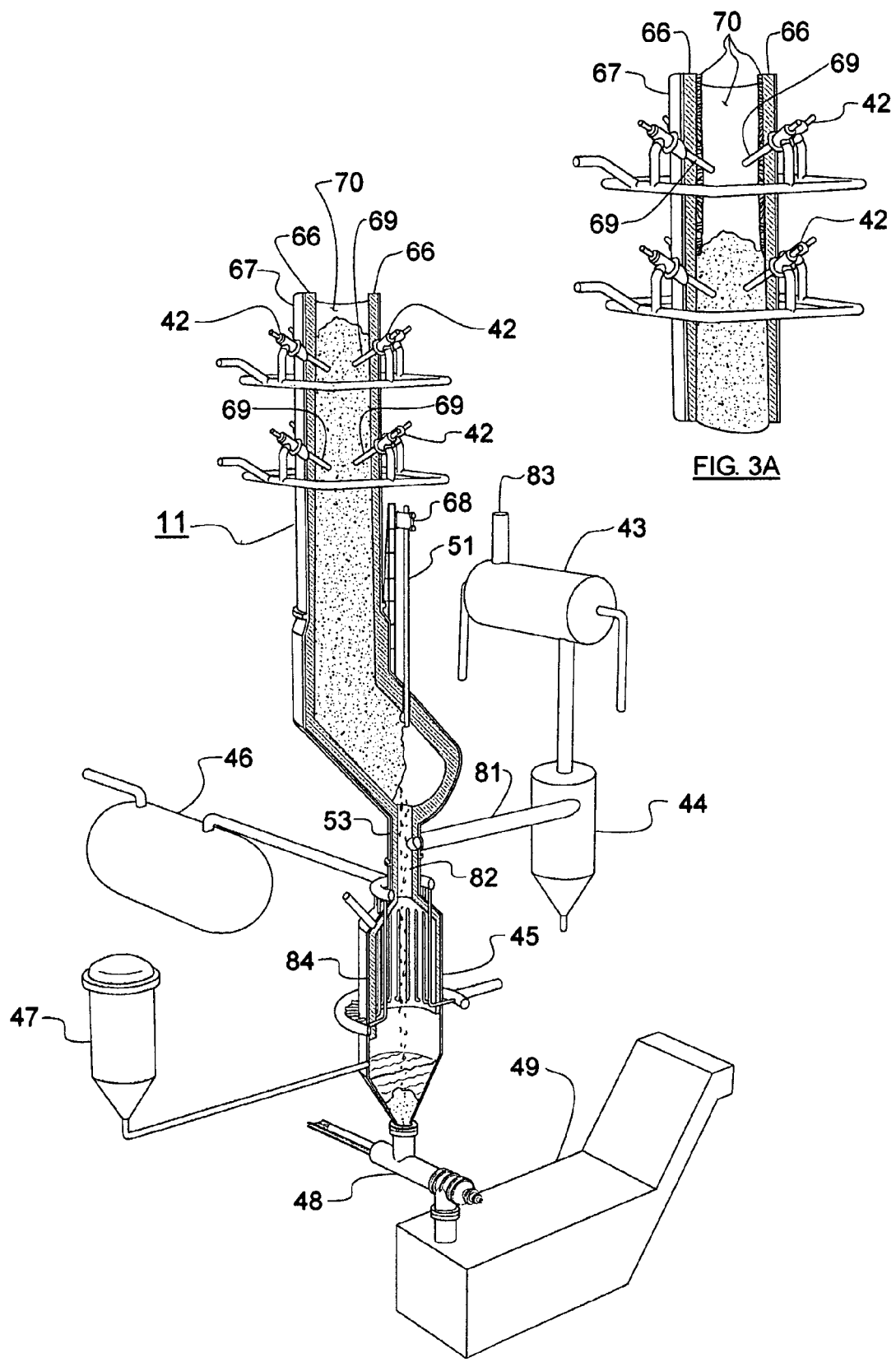
FIG. 3 represents a portion of the Gasifier shown in FIG. 1, but in section, with the charge being illustrated at high level.
FIG. 3A is a partial representation of FIG. 3, illustrating the charge at low level with the refractory wall above the level being protected with char.

Referring to FIG. 3, which is illustrated in section represents the lower portion of Gasifier 11 shown in FIG. 1; the lining of Gasifier 11 is denoted by numeral 66. Lining 66 is encased in an outer shell marked by numeral 67. To prevent bridging, the lining is configured to diverge in the downward direction. It is to be noted that lance 51 is disposed above port 53 in such a way as to permit its hoist which is marked by numeral 68, to lower lance 51 directly over port 53 in order to have full access to common port 53 to maintain it open. To provide protection to lining 66, injectors 42 are equipped with extended nozzles marked by numeral 69 to penetrate into the char which is denoted by numeral 70 in order to move the reaction zone away from the lining wall and use the char next to the wall to serve as an insulator between the reaction zone and the lining face; this lining-protection approach will be described in more detail in the Operation Section of this disclosure by referring to FIG. 3A.

Figure 4:
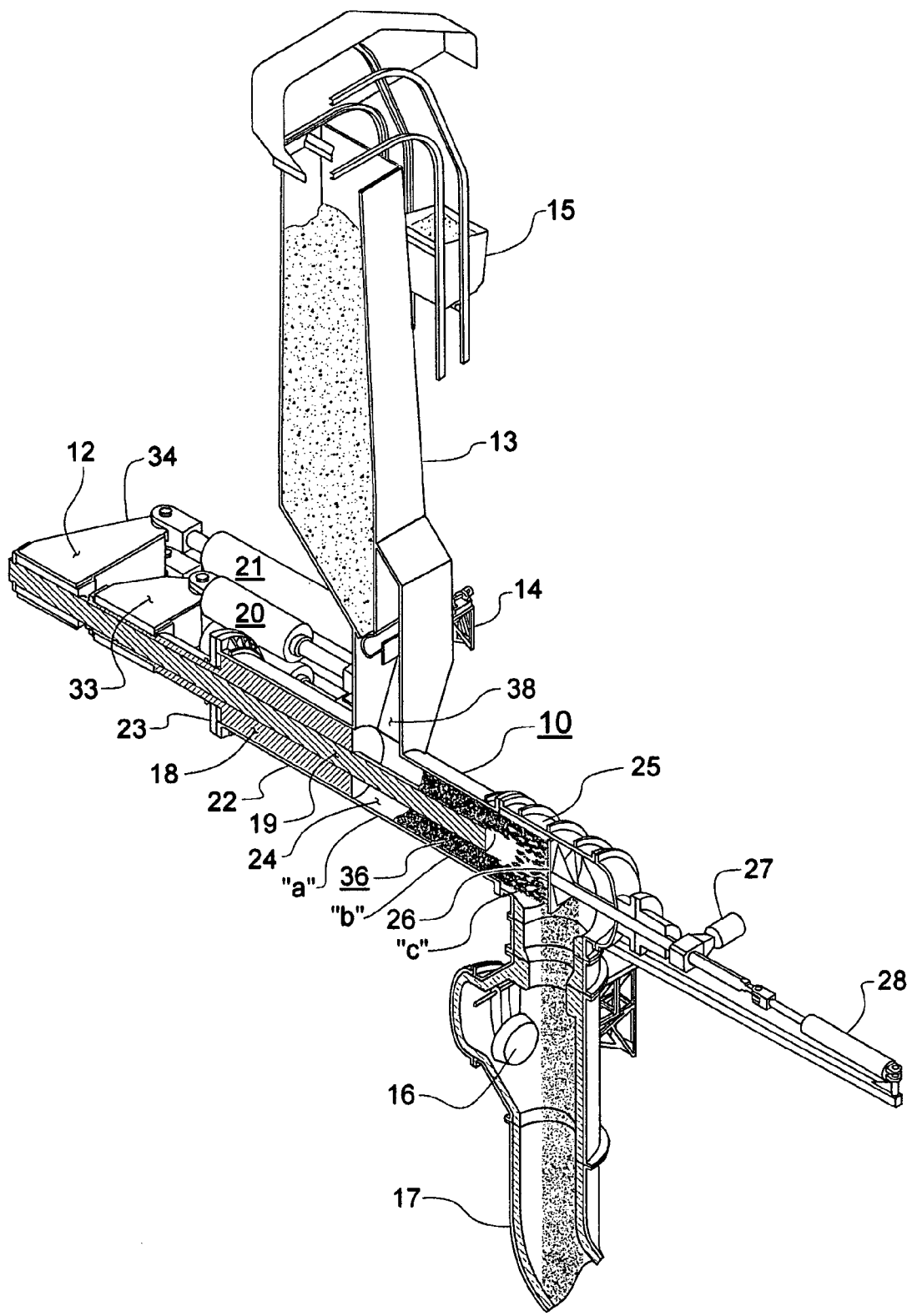
FIG. 4 represents the apparatus illustrated in section, to practice the method wherein a pushing ram is in the retracted position and a mandrel being disposed axially through the ram.

Referring to FIG. 4 which is shown in section, actuating means 12 is composed of ram 18 through which mandrel 19 is axially disposed. Ram 18, which takes the form of a piston, is equipped with a first cluster of hydraulic cylinders denoted by numeral 20, and mandrel 19 is equipped with a second independent cluster of hydraulic cylinders marked by numeral 21. Cluster of hydraulic cylinders 20 is interconnected to ram 18, and cluster of hydraulic cylinders 21 is interconnected to mandrel 19 and are configured in such a way as to provide independent movement of ram 18 from mandrel 19 and movement of mandrel 19 being independent from ram 18. Ram 18 is encased in a circular shell denoted by numeral 22, and is adapted to be retracted and extended within a charging chamber marked by numeral 24. A system of slip rings mounted to ram 18 (known in the art and not shown) facilitates the movement of ram 18 within shell 22. Mandrel 19, which is adapted to move within ram 18, is disposed in such a way that it can pass through a slip-ring bearing-seal housed within a flange connection that is denoted by numeral 23; such slip-ring bearing-seal is in common use in hydraulic cylinder structures by sealing the rod of the cylinder that extends and retracts in relation to the body of the cylinder itself.

Figure 8:
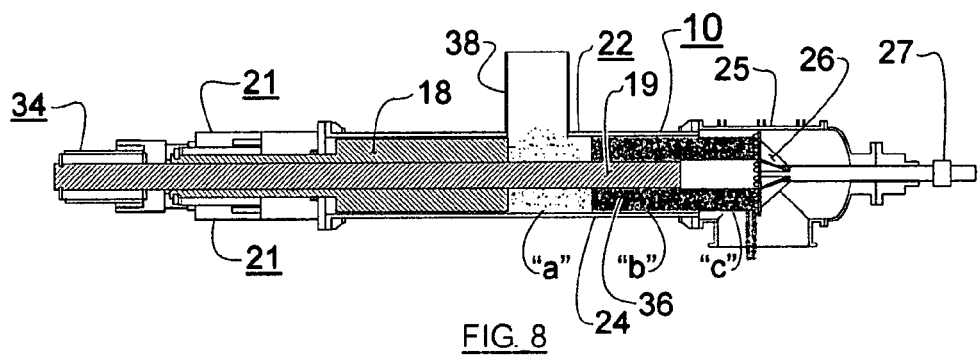
FIG. 8 represents an elevation of the charging apparatus in section showing the pushing ram in the retracted position and the mandrel extended.

Charging chamber 24 forms the extension of shell 22 and is comprised of three sections: A first section being at atmospheric pressure marked by letter "a" serves to receive a coal charge from feeder 14 by gravity, as shown in FIG. 8. A second section wherein the coal is compressed as an annulus within an annular space formed between mandrel 19 and the inner wall of shell 22, marked by letter "b," wherein the coal is crushed and reduced in size while being compacted by means of ram 18 to such an extent as to convert the coal by diminution into a dense mass formed from the crushing force of the ram while advancing the charge of coal by compaction to transform the loosely charged coal into an impervious, packed annular seal in section "b" denoted by numeral 36; such seal formed by the coal itself prevents pressurized gases from escaping from downstream of said second section "b" and into the atmosphere via said first section "a." A third section located downstream of section "b" that is maintained at pressure and marked by letter "c" wherein packed seal 36 is destroyed when a succeeding packed seal is formed in section "b" by a newly fed coal charge that is dropped by feeder 14 into section "a," moved by ram 18 while compressing it to convert the coal into a dense mass that acts as a newly packed seal and be impervious to pressurized gas flow, to thus replace the previously formed packed seal in section "b" while pushing such seal into section "c". Sections "a," "b" and "c" may be tapered towards the discharge end of chamber 24 to facilitate the movement of the coal within the charging chamber 24.

Figure 5:
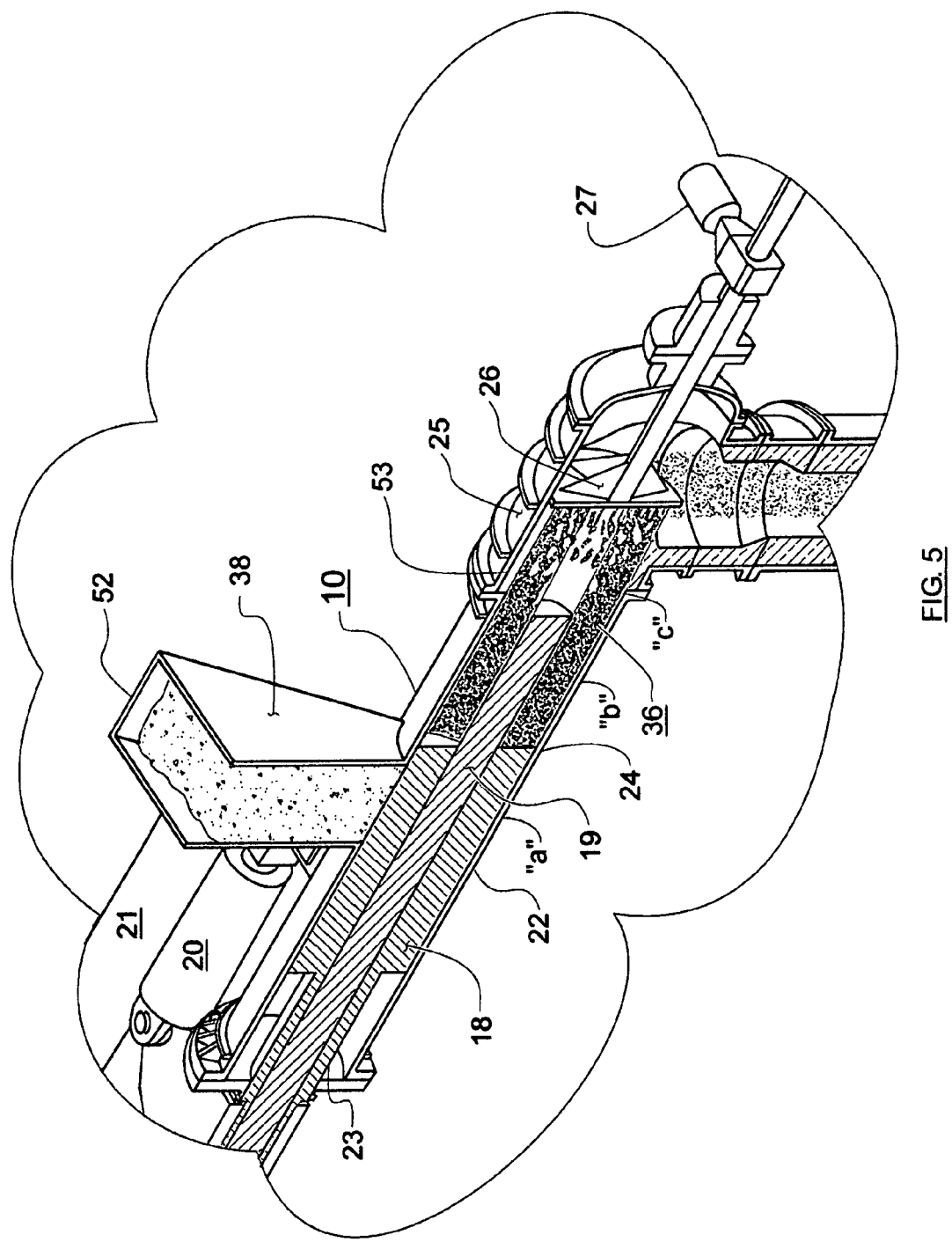
FIG. 5 represents an enlarged portion in section of the charging apparatus shown in FIG. 4, which accentuates the feed and a pressure seal with the ram and the mandrel being in the advanced position.

An elbow denoted by numeral 25 is disposed at the discharge end of charging chamber 24 and downstream of section "c". Within elbow 25, a cutter-breaker denoted by numeral 26 is provided; it may take one of several shapes, with the one shown by way of example being rotary with its motion effected by drive 27. Cutter-breaker 26 is configured in such a way as to be adapted to be advanced and retracted by hydraulic cylinder 28. FIG. 5 illustrates in larger scale, a portion of Charger 10 with ram 18 being in the advanced position, for additional clarification as compared to the ram position shown in FIG. 4. It is to be noted that the entry into elbow 25 may be tapered to diverge outwardly for providing relief after the formation of seal 36 in order to facilitate the movement of the previously formed seal into section "c" and towards the discharge end of elbow 25 when a new seal is being formed by ram 18 in section "b".

Figure 6:
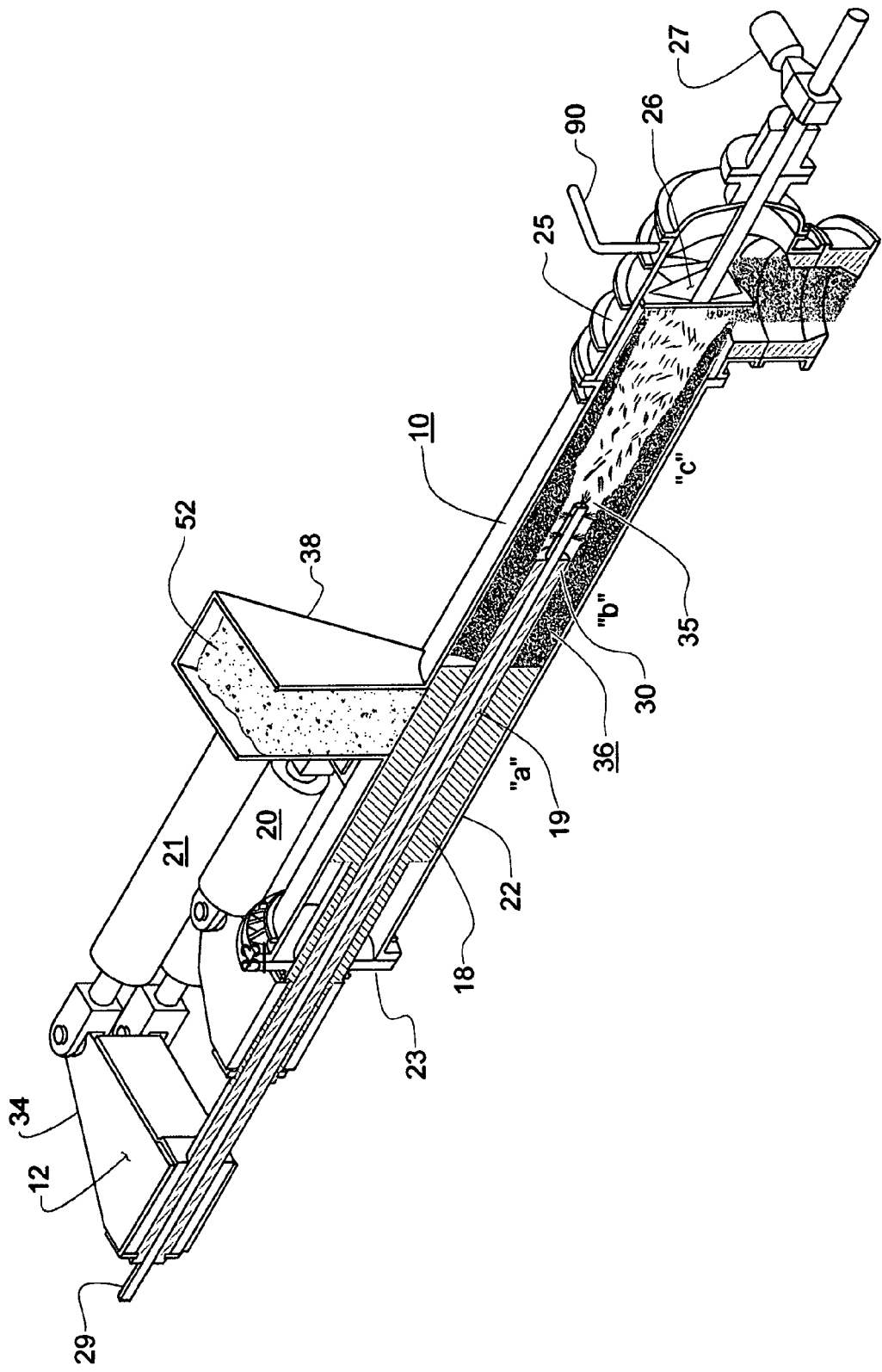
FIG. 6 represents the charging apparatus illustrating in section the injection of a gas containing oxygen by means of a lance which is disposed axially through the mandrel in order to pyrolyze the feed.

Referring to FIG. 6, Charger 10 is equipped with a lance denoted by numeral 29, which is disposed axially through mandrel 19, for the injection of a gas containing oxygen; preferably, lance 29 possesses means adapted for the injection of such oxygen-containing gas via nozzles located downstream of seal 36, one such nozzle being marked by numeral 35. This approach is used for initiating the gasification process via the devolatilization of the coal, producing a hot char which is highly reactive due to its porosity, to result in an increase in efficiency of Gasifier 11, shown in section in FIG. 3.

Figure 7:
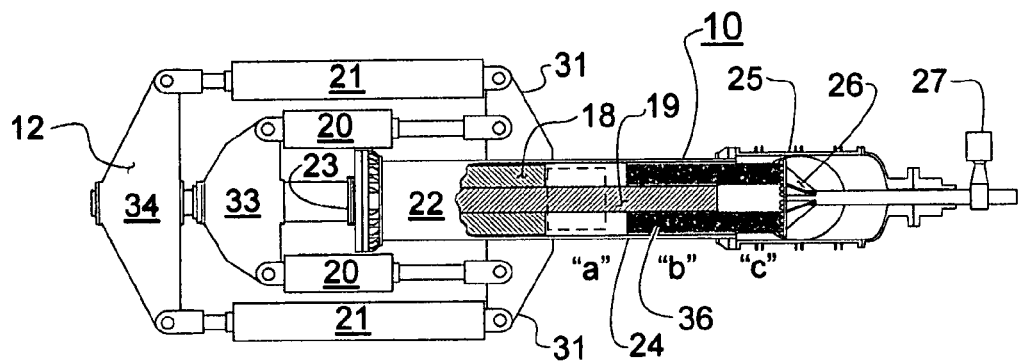
FIG. 7 represents a plan view of the charging apparatus with a cut-away showing the internals of the charging chamber.
Figure 9:
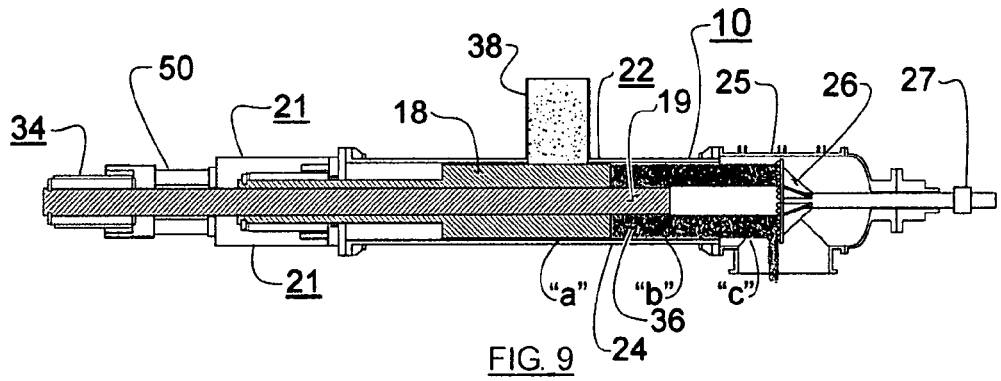
FIG. 9 represents an elevation of the charging apparatus in section showing the pushing ram in the advanced position and the mandrel at an intermediate position.
Figure 10:
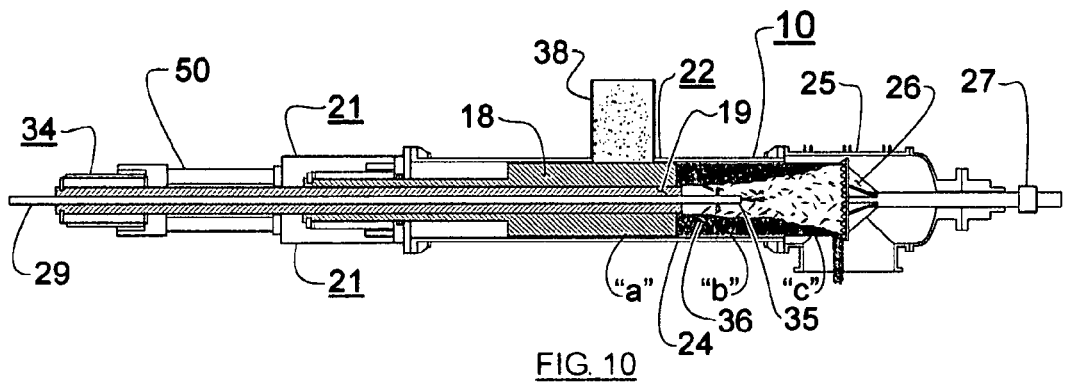
FIG. 10 represents an elevation of the charging apparatus in section showing the pushing ram in the advanced position and the mandrel at the retracted position with a lance disposed axially through the mandrel.

Referring to FIG. 7 which represents a top view inclusive of a cut-away, illustrates the actuating equipment to advance and retract ram 18; such equipment is denoted by a cluster of hydraulic cylinders 20 which are tied together via yoke 33. The actuating equipment to advance and retract mandrel 19 is denoted by cluster of hydraulic cylinders 21 which are tied together via yoke 34. Both clusters 20 and 21 of hydraulic cylinders are anchored at one end to wings 31 which are firmly fixed structurally to shell 22 of charging chamber 24; wings 31 serve as extensions for mounting cluster 20 and cluster 21 in order to enable yoke 33 to cause the advancement and retraction of ram 18, and also to enable yoke 34 to cause the advancement and retraction of mandrel 19. FIGS. 8, 9 and 10 will be described in more detail in the Operation Section of this disclosure.

Figure 11:
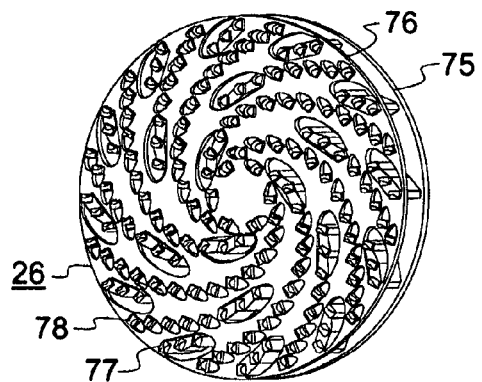
FIG. 11 is a frontal view of a cutter-head with the cutting bits being protruded.
Figures 11A, 11B:
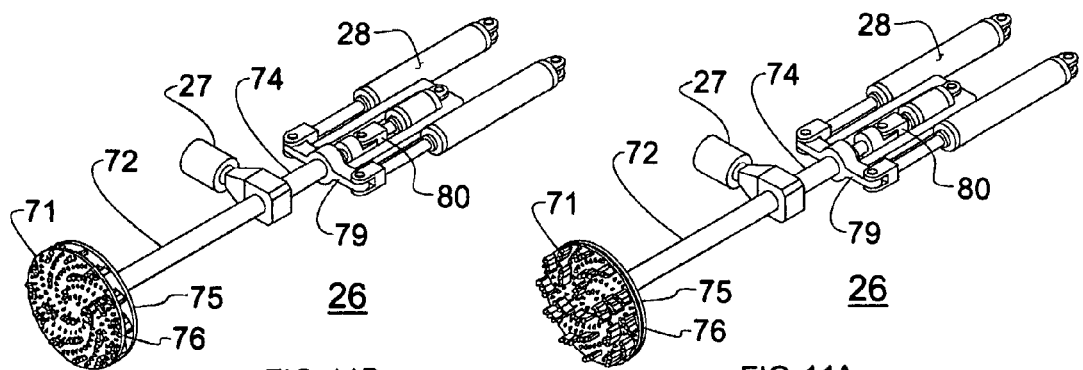
FIGS. 11A, 11B, 11C, and 11D illustrate the various details of the cutter-breaker.
Figures 11C, 11D:
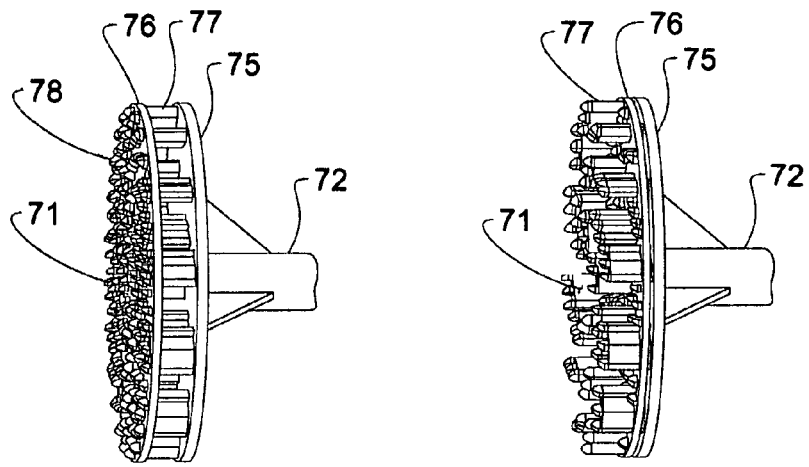

In describing cutter-breaker 26, reference is now made to FIG. 11 aided by detailed FIGS. 11A, 11B, 11C and 11D. Referring to FIGS. 11A and 11B, cutter-breaker 26 is made up of a head which is denoted by numeral 71, a rotating outer shaft marked by numeral 72, a drive 27, an inner shaft 74 and a hydraulic actuating system denoted by numeral 28. As shown in FIGS. 11C and 11D, head 71 of cutter breaker 26 is, in turn, made up of two disks: a fixed disk marked by numeral 75 and a moveable disk marked by numeral 76. Fixed disk 75 is mounted to outer rotating shaft 72 and moveable disk 76 is connected to inner shaft 74 shown in FIGS. 11A and 11B. Long cutting bits marked by numeral 77 are mounted to disk 75 and short cutting bits marked by numeral 78 are mounted to disk 76. These bits are mounted to the disks in such a way as to preferably assume a pattern as shown in FIG. 11.

Hydraulic actuating system 28 is configured into two sub-systems; namely, sub-system 79 which advances and retracts disk 75 and sub-system 80 which advances and retracts disk 76. In cutting coarse particles of coal or char from section "c" of charging chamber 24 (shown in FIGS. 4 and 6), head 71 assumes the position shown in FIG. 11C. In cutting fine particles, head 77 assumes the position shown in FIG. 11D. The retraction of disk 76 for cutting coarse particles or the advancement of disk 76 for cutting fine particles is effected by sub-system 80. Sub-system 79 enables the advancement or retraction of the entire head of cutter-breaker 26 by advancing or retracting shaft 72.

Operation

In describing the operation of the instant invention, such description will be divided into 5 parts; namely, Part 1 describing the charging and sealing to maintain the pressure in Gasifier 11; Part 2 describing gasification as case #1 covering the gasification of coal, and as case #2 the pyrolysis of the coal to produce a char followed by the gasification of the char; Part 3 describing gasification with the conversion of flue gas (waste gas) into a valuable by-product; Part 4 describing the process of gasification by alternating the air blowing from Gasifier 11A to 11B and vice-versa, illustrated in FIG. 2A; and Part 5 describing the invention as it relates to polygeneration inclusive of the co-production of a liquid fuel and electric power accompanied by the conversion of flue gas from the electric power generation into a fertilizer as a by-product such as oxamide or urea.

Part 1—Charging and Sealing

Referring to FIG. 1, the coal is delivered by bucket 15, dumped into bunker 13 and is fed into Charger 10 by means of feeder 14 via chute 38. Referring now to FIG. 8, chute 38 which is situated above section "a" of charging chamber 24, receives the coal in section "a" and the coal surrounds mandrel 19. Subsequent to the drop of coal into section "a," ram 18 moves the coal from section "a" to section "b" while compressing it to such an extent as to result in a compacted mass of coal that is impervious to gas flow, thus forming a packed seal from the coal itself by virtue of diminution of the coal being crushed while simultaneously pressing against the perimeter of mandrel 19 and against the internal circumferential perimeter of shell 22, shown in FIG. 9. In order to ensure that a packed seal is formed and is impervious to the flow of gases from section "c" into section "a," mandrel 19 is inserted into shell 22 a pre-determined length to provide a long enough extension within shell 22 commensurate with the gas pressure prevailing in pressurized elbow 25 shown in FIGS. 7, 8 and 9, and downstream from it in pressurized Gasifier 11 shown in FIG. 1. The higher the pressure downstream of section "b," the longer the insertion of mandrel 19 into shell 22. Further, controls are provided to automatically adjust such insertion to maintain a pre-set operating pressure downstream of section "b." Such automatic adjustment incorporated in the system controls (not shown, but known in the art) results in an improved operation in Gasifier 11 by achieving minimum pressure fluctuations.

Ram 18 reciprocates from the position shown in FIG. 8 to that shown in FIG. 9 whereas mandrel 19, in general, remains at a fixed position except when an adjustment to the pressure is required; such adjustment being automatic in response to operating conditions within Gasifier 11. As additional coal is fed into section "a" shown in FIG. 8 and ram 18 is advanced to compact the coal in section "b" shown in FIG. 9, the previously formed seal is pushed into section "c" where cutter-breaker 26 crushes the coal or char, and by gravity the crushed coal or char drops from elbow 25 into Gasifier 11 via downcomer 17 shown in FIG. 4. Isolation valve 16 which is disposed in downcomer 17 is generally left in the open position but is closed whenever maintenance is performed.

Part 2—Gasification: Case #1 and Case #2

Case #1 comprises the gasification of coal in Gasifier 11. It will be initially described and then followed by the description of coal pyrolysis and char gasification as Case #2. Referring to FIG. 1 again, the loose, unpulverized coal drops into Gasifier 11 where it is gasified by the injection of a gas containing oxygen such as air or oxygen by itself, via ports 42 using injectors 40. In certain instances steam is added with the gas containing oxygen, such steam being introduced by means of pipe 41.

Referring now to FIGS. 3 and 3A, which are illustrated in section, ports 42 are equipped with long injection nozzles denoted by numeral 69, which are adapted to introduce the gas containing oxygen a defined distance towards the center of Gasifier 11 and away from refractory wall 66 in order to form a barrier made up of coal/char marked by numeral 70 to provide protection to refractory wall 66 as the coal and/or char have insulating properties. By reacting the gas containing oxygen with the coal or char, gases are generated, and because of the intense heat, molten slag is formed. Both the gases and the slag flow to common port 53 and are separated as gaseous stream 81 and molten slag stream 82. Stream 81 is cleaned of particulate matter in cyclone 44, is adjusted for temperature in heat exchanger 43 and leaves through port 83 either as a raw fuel or as a chemical. Slag stream 82 is quenched in quencher 45 to solidify it. Thermal energy in the form of steam may be extracted from the molten slag by means of heat exchanger system 84 and collected in drum 46. The slag leaves Gasifier 11 as a quenched solid via discharger 48 and into tank 49.

Referring to FIGS. 6 and 10 to describe Case #2 which relates to the pyrolysis of the coal into hot char prior to gasification, a gas containing oxygen is injected into chamber 24 by means of lance 29 to combust part of the coal in section "c" in order to provide the thermal energy needed for the devolatilization of the coal to form a hot char which is discharged into Gasifier 11 shown in FIG. 3 by way of elbow 25 shown in FIG. 10. Lance 29 may be provided with various nozzles for the injection of the gas containing oxygen such as nozzle 35 disposed at the tip of lance 29; also, nozzles disposed along the side of lance 29 in addition to its tip, are provided for distribution of the gas containing oxygen within section "c" as shown in FIG. 6. Additional nozzles may be added through shell 22 for increasing the input of a gas containing oxygen.

Part 3—Gasification with the Conversion of a Waste Gas into a Valuable By-Product Reference is now made to FIG. 2. The feeding of the coal, the charging of the coal, the formation of a packed seal, the discharging into Gasifier 11 have been described above. The approach to make a by-product from waste gas will be described by way of example to make oxamide which is a compound composed of 2 carbon monoxides, 2 nitrogens and 4 hydrogens, also chemically known as $(CONH_2)_2$. Oxamide is a chemical closely related to urea and can be used as a substitute for urea as a fertilizer; the difference between oxamide and urea is that urea possesses one carbon monoxide (CO) instead of two and is chemically known as $CO(NH_2)_2$.

Waste gas or flue gas is a greenhouse gas composed mainly of $N_2+CO_2$ with the $CO_2$ being suspected to be a major contributor to global warming. According to *The Wall Street Journal* of Jul. 12, 2007, the coal-burning power stations in the United States emit about a third of the total $CO_2$ emitted in the country. The instant invention illustrated in FIG. 2 comprises the production of a raw gas from a portion of the char charged into Gasifiers 11; the rest of the char is used to make the oxamide by means of a downstream process described below. The raw gas leaves Gasifiers 11 via duct 57 to hot gas clean-up 60 wherein the raw gas is desulfurized in the lower vessel marked by numeral 64 containing a sorbent which is adapted to absorb the $H_2S$ contained in the raw gas; the cleaned gas leaves vessel 64 via port 82. As the sorbent becomes spent it is discharged from the bottom of vessel 64 and transported by means of transporter 81 to the top vessel marked by numeral 65 where the sorbent is regenerated by releasing its sulfur via port 89. An oxygen containing gas is injected into port 88 to cause the reactions that regenerate the sorbent.

The remaining portion of the hot char (C) not consumed in Gasifiers 11 is discharged into cyanogen unit 55 wherein waste gas ($N_2+CO_2$) is injected via ports 62. The chemical reaction taking place in cyanogen 55 is as follows:

$$(N_2+CO_2)+3C \rightarrow C_2N_2+2CO \text{ flue gas+hot char} \rightarrow \text{cyanogen gas+carbon monoxide}$$

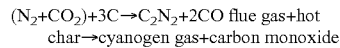

with the slag and the cyanogen gas exiting through common port 53. The slag is quenched in quencher 45 and the cyanogen gas is directed to reaction column 56 after being cleaned in cyclone 44, and is reacted with steam to convert it to oxamide $(CONH_2)_2$ according to the following chemical reaction:

$$C_2N_2+2H_2O \rightarrow (CONH_2)_2 \text{ Cyanogen+steam} \rightarrow \text{oxamide}$$

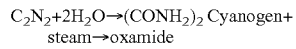

with the steam being injected via port 85 and the oxamide exiting through port 86.

If it is desired to remove the carbon monoxide from the cyanogen gas prior to treatment with steam, separator 63 is used as illustrated to the right side of cyanogen unit 55. The crystallization of the oxamide takes place thereafter.

In making urea, the following chemical reactions take place:

$$(N_2+CO_2)+3C \rightarrow C_2N_2+2CO \quad C_2N_2+2H_2O \rightarrow CO(NH_2)_2+CO \text{ cyanogen+steam} \rightarrow \text{urea+carbon monoxide}$$

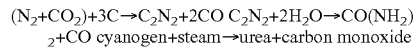

Part 4—Gasification by Alternating the Air Blowing from Gasifier 11A to 11B and Vice-Versa Illustrated in FIG. 2A Referring to FIG. 2A, it is assumed that the coal feed is a sub-bituminous coal which contains roughly 30% moisture as found abundantly in the western part of the United States. Subsequent to pyrolysis, the volatile matter together with the steam generated from the moisture are directed via duct 90A to feed either Gasifier 11A or 11B depending upon as to which Gasifier is blown with air while the hot char is being fed from pyrolysis chambers 24 into both Gasifiers 11A and 11B. When Gasifier 11A is being blown with air using manifold 100A, valve 59A is closed and valve 59B is opened; at such a condition the volatile matter and steam are directed to gasifier 11B to make a rich gas while the char in gasifier 11A is raised in temperature by means of the air being blown into it while at the same time producing a lean gas, with both gases flowing downwardly, the rich gas in Gasifier 11B and lean gas in Gasifier 11A. The rich gas exits from the bottom of Gasifier 11B and flows through duct 91B with valve 92B open and valve 93B closed; with respect to Gasifier 11A, the lean gas exits from the bottom via duct 91A with valve 92A closed and valve 93A open, as diagrammatically shown in FIG. 2B. Thus the rich gas is directed to gas cleanup 60B via duct 97 and the lean gas is directed to gas cleanup 60A via duct 96.

When Gasifier 11B is being blown with air using manifold 100B, valve 59A is opened and valve 59B is closed; at such a condition the volatile matter and steam are directed to Gasifier 11A to make an enhanced $H_2$ rich gas while the char in Gasifier 11B is raised in temperature by means of the air being blown into it while at the same time producing a lean gas, with both gases flowing downwardly, the rich gas in Gasifier 11A and the lean gas in Gasifier 11B. The enhanced $H_2$ rich gas exits from the bottom of Gasifier 11A and flows through duct 91A with the valve 92A open and valve 93A closed; with respect to Gasifier 11B, the lean gas exits from the bottom of Gasifier 11B and flows through duct 91B with valve 92B closed and valve 93B open as diagrammatically shown in FIG. 2C. Thus the enhanced $H_2$ rich gas is directed to gas cleanup 60B via duct 97 and the lean gas is directed to gas cleanup 60A via duct 96.

It is to be noted that the switching of the air blowing cycle from one Gasifier into the other occurs periodically to give enough time to raise the temperature of the char to such an extent as to provide adequate super heat in the char in order to provide the thermal energy required by the reaction of converting the char to water gas ($CO+H_2$) when the moist rich gas comes in contact with hot char. In cases where the coal does not possess enough moisture as is the case with bituminous coal, provisions are made to add steam to the rich gas to furnish the required moisture.

Further, in cases where the $H_2$ ratio in relation to CO in the clean rich gas leaving cleanup 64B via pipe 82B, is insufficient for the production of a synthetic chemical such as methanol, synthetic natural gas or other chemical, a shift reactor as denoted by numeral 101 is provided wherein the $H_2$ content in the gas is increased by making use of steam injected via port 102 with the $H_2$-adjusted gas leaving via port 103; shift reactor 101 is known in the art of synthesis.

Part 5—Polygeneration of Liquid Fuel, Electric Power and Oxamide

Figure 12:
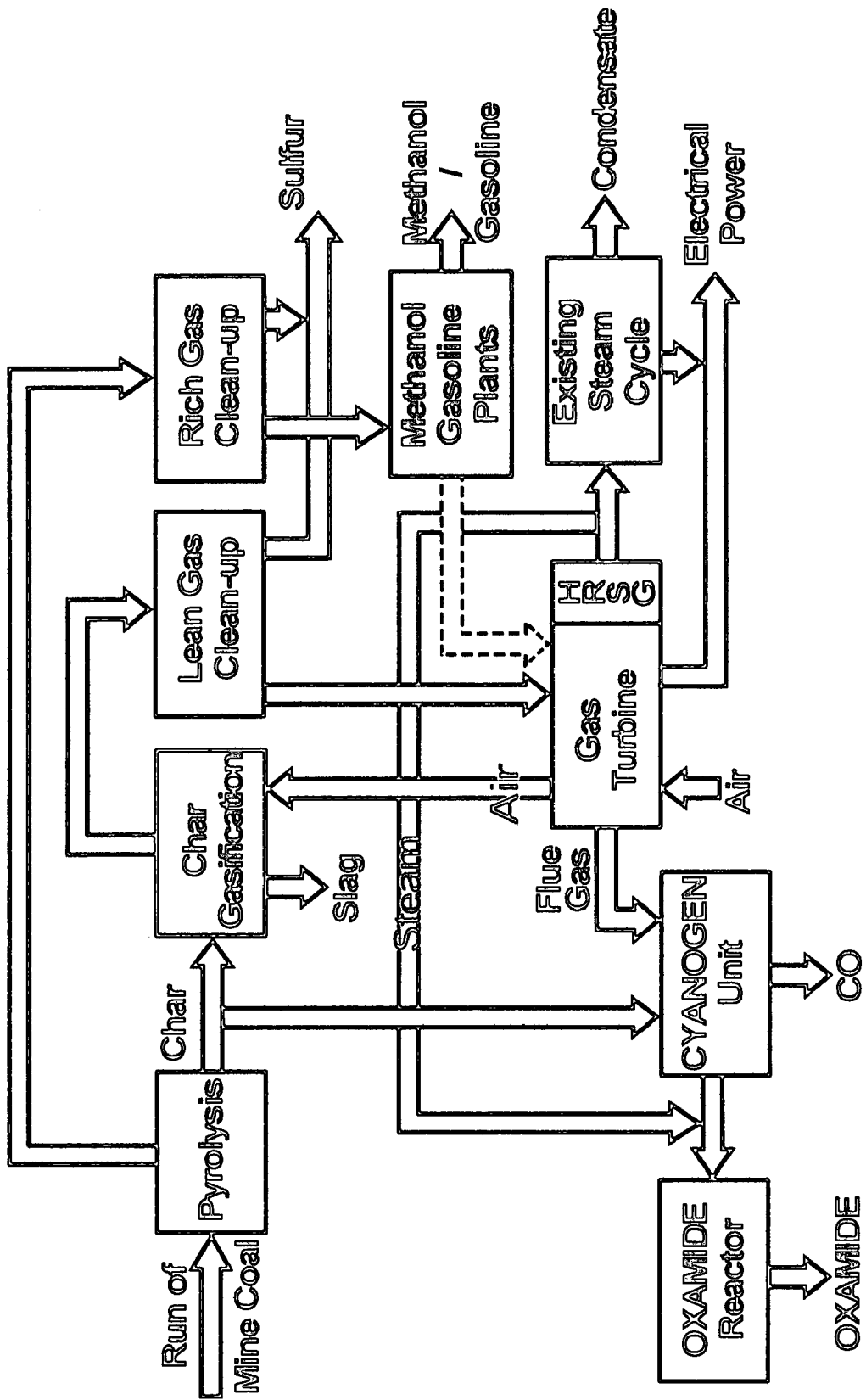
FIG. 12 is a flow diagram illustrating the instant method as applied to polygeneration of several products.

Referring to FIG. 12, which represents a flow diagram that illustrates the various process steps that take place in polygeneration resulting in producing liquid transport fuel in the form of methanol converted to gasoline, electric power via the combined cycle mode, and fertilizer in the form of oxamide. It is to be noted that these products are by way of example as the methanol-to-gasoline may be replaced by producing synthetic natural gas or other liquid or gaseous fuels, the electric power may be a simple cycle and the oxamide may be replaced by urea or another chemical.

As illustrated in FIG. 12, the coal goes through the step of pyrolysis, producing a rich gas which is high in hydrogen content; it is cleaned and desulfurized, making it suitable for being synthesized to methanol which is converted to gasoline via the methanol-to-gasoline process of Exxon-Mobil. In addition to the rich gas produced in the pyrolysis step, a char is also produced. This char is divided into two streams; the first stream is directed to a gasifier where char gasification takes place, producing a lean gas and slag. The lean gas, after cleanup, is directed to the gas turbine component of the combined cycle where it serves as the fuel for the gas turbine to generate electric power and the hot off-gas from the gas turbine is passed through a HRSG (known as a heat recovery steam generator) whose steam is directed to a steam cycle to generate additional electric power.

The second stream of char is directed to a cyanogen unit; in addition, the flue gas resulting from the combustion of the lean gas in the gas turbine is directed after extracting most of its thermal energy in the HRSG, to the cyanogen unit where, the $N_2$ in the flue gas reacts with the char to make cyanogen ($C_2N_2$) and the $CO_2$ in the flue gas reacts with the char to convert it to CO which is separated from the $C_2N_2$. The cyanogen thence is directed to the oxamide reactor along with steam to form oxamide. The flow diagram also shows a dotted arrow leading from the methanol/gasoline plants to the gas turbine; this is to indicate that for start-up and back-up, liquid fuel from these plants can be furnished to the gas turbine. Also, the word "existing" appears in the steam cycle; existing power stations use steam cycles per se to generate power. This is to indicate that it is possible to make use of existing steam turbines and generators in current coal-burning power stations by converting them into efficient power stations by adding gas turbines and HRSGs up-stream of existing steam turbines, thus repowering them in order to reduce capital cost while facilitating the obtaining of construction permits.

Further, the flow diagram indicates the use of air from the gas turbine being directed to the char gasification step. By reacting the char with air so as to make a lean gas three major advantages are achieved. The first is that lean gas has more mass than if the turbine fuel consisted of syngas which was made in a gasifier blown with oxygen; more mass in the fuel gas means more efficiency at the turbine. Secondly, a lean gas burns cooler, meaning that $NO_X$ emissions are quite low. Thirdly, the capital cost is reduced by virtue that the costly air separation plant to make oxygen for gasification is obviated.

All in all, it is submitted that the foregoing disclosure demonstrates an improved method and apparatus for gasifying solid fuels that meet the stated objectives listed at the beginning of the specification.

What is claimed comprises the following:

1. A method for the gasification of a solid fuel in a pressurized gasifier wherein the solid fuel undergoes compression by means of a reciprocating ram disposed at the entrance of a charging chamber that is interposed downstream of said ram and upstream of said gasifier, comprising the following steps:

feeding the solid fuel into a first section of said charging chamber under atmospheric pressure conditions;

advancing the solid fuel that was fed from said first section of said charging chamber into a second section of said charging chamber by means of said ram while at the same time compressing said solid fuel against the surface area of the internal wall of said charging chamber to form a crushed, packed mass of such density as to become a seal composed of the solid fuel itself in said second section, that is impervious to the flow of pressurized gases to thus maintain the operating pressure within said gasifier by preventing the flow of gases from said pressurized gasifier into the atmosphere via the first section of said charging chamber and complementing the action of compressing said solid fuel by including a mandrel disposed through the axis of said ram to provide additional surface area created by the circumferential perimeter of said mandrel to augment the surface area against which the solid fuel is compressed and moving said mandrel independently of said ram by advancing or retracting it in order to meet the required operating pressure of said gasifier;

moving said seal from said second section of said charging chamber into a third section of said charging chamber by means of the pushing forces applied by the ram during the formation of a new and succeeding seal in said second section, thus displacing the previously formed seal from the second section to the third section of the charging chamber;

discharging the displaced seal from said third section of said charging chamber into the pressurized gasifier located downstream of said charging chamber; and gasifying said solid fuel in said pressurized gasifier.

2. The method as set forth in claim 1 wherein the step of moving said mandrel is further characterized by the step of activating controls that are initiated by the rise or fall of the pressure within said gasifier to maintain a substantially uniform operating pressure within said gasifier.

3. The method as set forth in claim 1 including the step of injecting a gas containing oxygen to pyrolyze said solid fuel in said third section of said charging chamber to devolatize it in order to result in producing a hot char and a $H_2$ rich gas.

4. The method as set forth in claim 3 wherein the step of injecting a gas containing oxygen is further characterized by employing a lance that is adapted to be advanced or retracted within said charging chamber.

5. The method as set forth in claim 4 wherein the step of employing a lance for injecting a gas containing oxygen is further characterized by providing an axial passage along the length of said mandrel to accommodate the clearance for the mobility of said lance within said mandrel.

6. The method as set forth in claim 1 wherein the step of gasifying said solid fuel is characterized by said fuel being coal.

7. The method as set forth in claim 3 including the step of converting said char into a gas.

8. The method as set forth in claim 3 includes the step of dividing said char into two portions wherein the first portion is converted into a gas and the second portion is reacted with a waste gas containing N2 and CO2 to produce a by-product.

9. The method as set forth in claim 8 includes the step of cleaning the gas produced from said first portion of char, thus making it suitable for the generation of electric power in a gas turbine.

10. The method as set forth in claim 8 wherein said by-product is characterized as being cyanogen.

11. The method as set forth in claim 10 comprises the step of converting said cyanogen into a fertilizer.

12. The method as set forth in claim 10 being further characterized by converting said cyanogen into oxamide.

13. The method as set forth in claim 11 being further characterized by converting said cyanogen into urea.

14. The method as set forth in claim 3 including the steps of cleaning said H2 rich gas and thence producing a by-product in the form of a fuel or a chemical.

15. The method as set forth in claim 14 whereas said by-product is characterized as being methanol.

16. The method as set forth in claim 15 includes the step of converting said methanol into gasoline.

17. The method as set forth in claim 14 wherein said by-product is characterized as being synthetic natural gas.

18. The method as set forth in claim 1 wherein the step of gasifying said solid fuel in said pressurized gasifier is further characterized by employing a gas containing oxygen which consists of pure oxygen.

19. The method as set forth in claim 1 wherein the step of gasifying said solid fuel in said pressurized gasifier is further characterized by employing a gas containing oxygen which consists of air.

20. The method as set forth in claim 1 wherein the step of discharging the displaced seal from said third section of said charging chamber into the pressurized gasifier is further characterized by the step of cutting or breaking said seal into fine or coarse particles on their way to said gasifier.

21. The method as set forth in claim 1, wherein the step of feeding the solid fuel into said first section of said charging chamber is further characterized by the step of moving said solid fuel within a bunker whose configuration is divergent towards its discharging bottom end in order to prevent bridging of said solid fuel within said bunker.

22. The method as set forth in claim 1 wherein the step of gasifying said solid fuel in said pressurized gasifier is further characterized by the step of providing protection to the refractory lining of said gasifier by utilizing a circumferential layer composed of a portion of the solid fuel fed into said gasifier to reside next to the refactory lining as an insulating barrier.

23. The method as set forth in claim 22 wherein the step of providing protection to the refractory lining of said gasifier is further characterized by the step of inserting the nozzles for the injection of the gas containing oxygen beyond said insulating barrier while pointing towards the center of said gasifier.

24. The method as set forth in claim 3 wherein the step of producing a hot char and a $H_2$ rich gas containing steam is further characterized by the steps of employing a pair of gasifiers marked 11A and 11B that are interconnected with valves at the top to enable the feed of hot char into both gasifiers while air and $H_2$ rich gas containing steam being alternately injected to each gasifier in such a way that when air is injected into gasifier 11A the $H_2$ rich gas containing steam is injected into gasifier 11B, and when the air is injected into gasifier 11B the $H_2$ rich gas containing steam is injected into gasifier 11A to result in continuously generating a stream of lean gas and a stream of enhanced $H_2$ rich gas.

25. The method as set forth in claim 24 wherein the step of employing a pair of gasifiers is further characterized by the step of using air exclusively for the alternate injection of air into said gasifiers in order to reduce capital cost by obviating the need for an oxygen producing facility to supply oxygen for gasification and also to produce a lean gas which is an excellent fuel for a gas turbine by virtue of the mass contained in the lean gas and its low $NO_X$ formation when combusted in the turbine.

26. The method as set forth in claim 24 wherein the step of generating a stream of lean gas and a stream of enhanced $H_2$ rich gas is further characterized by the step of cleaning both generated gases exiting from said gasifiers prior to further utilization of the lean gas and the enhanced $H_2$ rich gas.

27. The method as set forth in claim 1 wherein the step of feeding the solid fuel in the first section of said charging chamber is further characterized by the step of feeding a solid fuel with high moisture content such as a sub-bituminous coal.

28. The method as set forth in claim 1 wherein the step of feeding the solid fuel includes the use of said fuel in a crushed form and not in a pulverized form in order to save the energy required for pulverization.

29. The method as set forth in claim 1 wherein the step of advancing the solid fuel from said first section to said second section of said charging chamber by means of said ram while at the same time compressing said solid fuel is further characterized by the step of crushing said solid fuel to reduce its size while being compacted in order to enhance the formation of a dense mass that is impervious to the flow of gases.

* * * * *